(12) United States Patent
Storey et al.

(10) Patent No.: US 11,914,311 B2
(45) Date of Patent: Feb. 27, 2024

(54) PRINT PARTICLE SUPPLY VALVES

(71) Applicant: HEWLETT-PACKARD DEVELOPMENT COMPANY, L.P., Spring, TX (US)

(72) Inventors: Matthew James Storey, Austin, TX (US); Jefferson Blake West, Austin, TX (US); Corbett Benjamin Schoenfelt, Austin, TX (US); Zackary Thomas Hickman, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 765 days.

(21) Appl. No.: 17/046,886

(22) PCT Filed: Aug. 30, 2018

(86) PCT No.: PCT/US2018/048817
§ 371 (c)(1),
(2) Date: Oct. 12, 2020

(87) PCT Pub. No.: WO2020/046333
PCT Pub. Date: Mar. 5, 2020

(65) Prior Publication Data
US 2021/0146696 A1 May 20, 2021

(51) Int. Cl.
*B41J 2/175* (2006.01)
*B22F 10/20* (2021.01)
(Continued)

(52) U.S. Cl.
CPC ......... *G03G 15/0867* (2013.01); *B22F 10/20* (2021.01); *B22F 12/50* (2021.01);
(Continued)

(58) Field of Classification Search
CPC ....................................................... B41J 2/175
See application file for complete search history.

(56) References Cited

U.S. PATENT DOCUMENTS

| 4,627,476 A | 12/1986 | Wilcke |
| 5,774,773 A | 6/1998 | Otsuka et al. |

(Continued)

FOREIGN PATENT DOCUMENTS

| CN | 1601395 A | 3/2005 |
| CN | 1773387 A | 5/2006 |

(Continued)

OTHER PUBLICATIONS

Okada, MachineTranslationofJP3 467650 B2, 2003 (Year: 2003).*
Fujita akira, MachineTranslationofJP-2004151521-A, 2004 (Year: 2004).*

*Primary Examiner* — Scott A Richmond
(74) *Attorney, Agent, or Firm* — Foley & Lardner LLP (57) ABSTRACT

Examples described herein relate to a supply valve consistent with the disclosure. For instance, a supply valve to supply print particles to a receptacle, the supply valve may comprise a print particle exit, a print particle entrance perpendicular to the print particle exit, and a liner adjacent to the print particle exit, where the liner is to wipe print particles, when present, from the supply valve responsive to the transition of the supply valve between a closed position and an open position.

9 Claims, 5 Drawing Sheets

(51) Int. Cl.
  *B22F 12/50* (2021.01)
  *B29C 64/259* (2017.01)
  *B29C 64/321* (2017.01)
  *B33Y 30/00* (2015.01)
  *B33Y 40/00* (2020.01)
  *G03G 15/08* (2006.01)

(52) U.S. Cl.
  CPC .......... *B29C 64/259* (2017.08); *B29C 64/321* (2017.08); *B33Y 30/00* (2014.12); *B33Y 40/00* (2014.12); *B41J 2/17509* (2013.01); *B41J 2/17596* (2013.01)

(56) References Cited

U.S. PATENT DOCUMENTS

| | | | |
|---|---|---|---|
| 6,141,520 | A | 10/2000 | Kosuge |
| 6,862,420 | B1 | 3/2005 | Less |
| 7,787,784 | B2 | 8/2010 | Hori |
| 7,899,370 | B2 | 3/2011 | Nakajima |
| 7,920,811 | B2 | 4/2011 | Murase et al. |
| 7,983,592 | B2 | 7/2011 | Naito et al. |
| 2003/0103782 | A1* | 6/2003 | Dilanni .............. G03G 15/0867 399/262 |
| 2006/0104671 | A1 | 5/2006 | Murakami et al. |
| 2011/0064479 | A1 | 3/2011 | Sasaki |

FOREIGN PATENT DOCUMENTS

| | | | |
|---|---|---|---|
| CN | 101078901 | A | 11/2007 |
| CN | 201740981 | U | 2/2011 |
| CN | 102023526 | A | 4/2011 |
| CN | 202702869 | U | 1/2013 |
| CN | 207301639 | U | 5/2018 |
| EP | 1659455 | | 5/2006 |
| JP | S6098468 | A | 6/1985 |
| JP | 2000-267415 | A | 9/2000 |
| JP | 3 467650 | B2 * | 11/2003 |
| JP | 3467650 | B2 | 11/2003 |
| JP | 2004151521 | A * | 5/2004 ......... G03G 15/0894 |
| JP | 2005-308972 | A | 11/2005 |
| RU | 2207958 | | 7/2003 |
| RU | 2545470 | | 3/2015 |
| WO | 2011/147278 | A1 | 12/2011 |

* cited by examiner

PRINT PARTICLE SUPPLY VALVES

BACKGROUND

Printing device such as printers, copiers, etc. may be used to form markings on a print medium, such as text, images, etc. Printing device may form markings on the print medium and/or form a three-dimensional object by employing a print substance such as an ink, toner, and/or a three-dimensional (3D) printing substance such as three-dimensional printing powders, etc.

DETAILED DESCRIPTION

Printing devices may form markings on a print medium (e.g., paper, photopolymers, plastics, composite, metal, wood, etc.) by transferring a print particle (e.g., ink, toner, 3D printing powder, etc.) from a reservoir to print medium. A print particle refill bottle may be used to refill a reservoir when the amount of print particles in the reservoir is not at capacity. That is, as the printing device draws the print particles from the reservoir, the amount of print particles in the reservoir may deplete. As a result, the amount of print particles in the reservoir of the printing device may have to be replenished.

However, print particle residue may remain on the surface of a receptacle or the supply valve after the transfer of print particles into the reservoir is complete. Print particle residue remaining on the surface of the receptacle or the supply valve may cause the print particle residue to transfer onto the user as well as other non-intended surfaces. In addition, print particle residue remaining on the surface of the supply valve and/or the receptacle may contaminate the print particles entering the reservoir.

As such, print particle supply valves, as described herein, may include a print particle entrance, a print particle exit, and a liner to limit the amount of print particle remaining on the surface of the receptacle and/or supply valve by wiping print particles as the supply valve transitions. Limiting the amount of print particle remaining on the receptacle and/or supply valve may reduce the amount of contaminated print particle entering the reservoir. Accordingly, this disclosure describes supply valve that wipe print particles remaining on the surface of a receptacle and/or on the supply valve after a refill process thereby reducing the amount of contaminated print particles that enter the reservoir and reducing the amount of transferable print particles remaining after a refill process.

Figure 1:
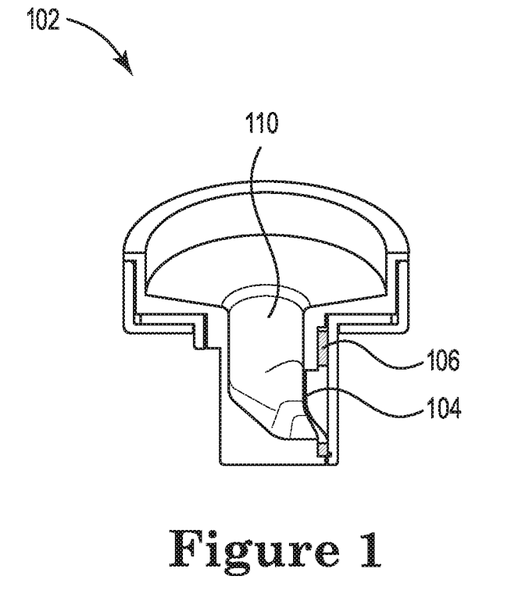
FIG. 1 illustrates an example of a supply valve consistent with the disclosure.

FIG. 1 illustrates an example of a supply valve 102 consistent with the disclosure. The supply valve 102 may be used with a variety of printing devices, such as printers, copiers, etc., for example. As used herein, "supply valve" refers to a device that communicates print particles into a receptacle. As used herein, "receptacle" refers to a device that communicates print particles from a supply valve into a reservoir. In some examples, the supply valve 102 may assist in the transfer of print particles into a reservoir. As used herein, "reservoir" refers to a vessel, box, carton, or other suitable repository for the containment of a print particles for use by the printing device. The supply valve 102 may come in contact with a receptacle to transfer print particles into a reservoir. For instance, print particles may travel through the supply valve and through a receptacle to enter the reservoir. As used herein, "print particles" refers to a substance which, when applied to a medium, may form representation(s) on the medium during a print job. In some examples, the print particles may be deposited in successive layers to create three-dimensional (3D) objects. However, this disclosure is not so limited. In some examples, print particles may be deposited on a print medium such as paper to form representation(s).

In some examples, the supply valve 102 may include a print particle entrance 110. Print particles may enter into the supply valve 102 by traveling through the print particle entrance 110. In addition, the supply valve 102 may include a print particle exit 104 positioned perpendicular to the print particle entrance 110. In some examples, having the print particle entrance 110 perpendicular to the print particle exit 104 may reduce the size of the supply valve 102, That is, positioning the print particle entrance 110 perpendicular to the print particle exit 104 allows the print particle entrance and exit to be in the same line of axis thereby reducing the amount of space to communicate print particle through the supply valve 102. In some examples, reducing the size of the supply valve 102 may reduce the cost of producing the supply valve 102. In addition, reducing the size of the supply valve 102 may reduce the size of the receptacle. As used herein, "print particle exit" refers to an opening of the supply valve through which material (e.g., print particles) may be moved. As used herein, "print particle entrance" refers to an opening of the supply valve through which material (e.g., print particles) may enter.

In some examples, as print particles exits the supply valve 102 through the print particle exit 104 residual print particles may remain on the mouth of the print particle exit 104. As such, the supply valve 102 may include a liner 106 adjacent to the print particle exit 104. It should be understood that when an element is referred to as being "adjacent" to another element, it may be on, in contact, connected, next to, or coupled with the other element. The liner 106 may clean print particles from the print particle exit 104 after a refill process is completed. For instance, after the refill process is completed and the liner 106 may wipe the print particle exit 104 removing residual print particles from the mouth of the print particle exit 104 and/or the surface of the supply valve 102. As used herein, "refill process" refers to the act of adding print particles to the reservoir. The liner 106 may limit the amount of print particles that are present on the print particle exit 104 after the transfer of print particles. That is, the liner 106 may wipe excess print particles from the print particle exit 104 after the transfer of print particles to limit the amount of print particles present on the surface of the supply valve 102 after the transfer of print particles. As used herein, "wipe" refers to the act of cleaning by rubbing.

Figure 2:
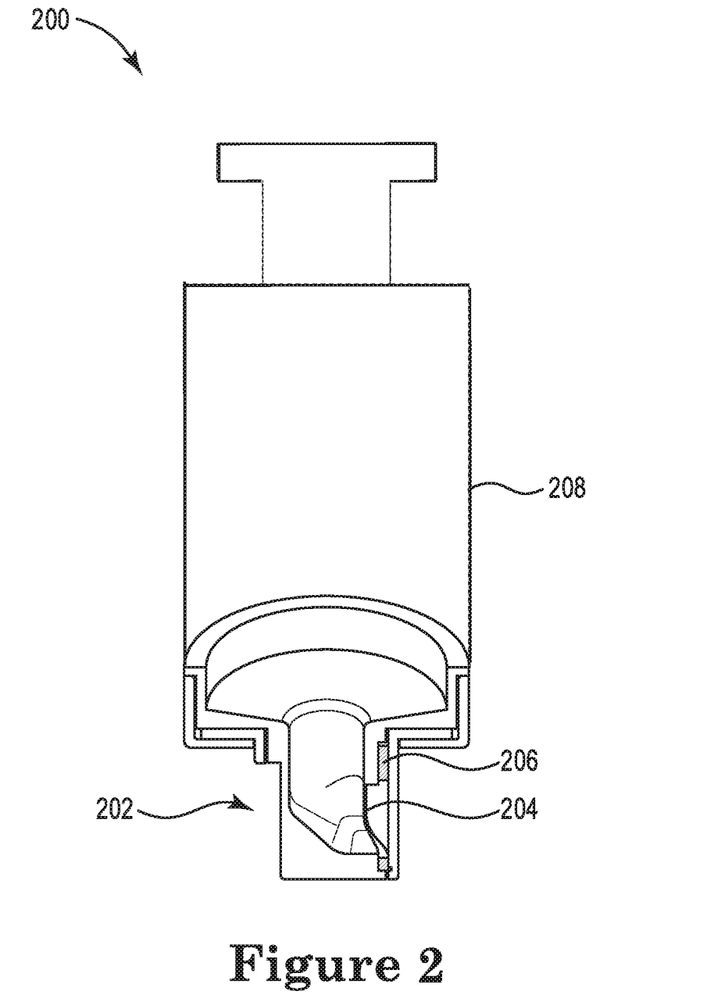
FIG. 2 illustrates an example of a print particle refill bottle consistent with the disclosure.

FIG. 2 illustrates an example of a print particle refill bottle 200 consistent with the disclosure. Supply valve 202 is analogous or similar to supply valve 102 of FIG. 1. Print particle exit 204 is analogous or similar to print particle exit 104 of FIG. 1. Liner 206 is analogous or similar to liner 106 of FIG. 1.

The print particle refill bottle 200 may be used with a variety of printing devices, such as printers, copiers, etc., for example. As used herein, "printing device" refers to a hardware device with functionalities to physically produce representation(s) of text, images, models, etc. on a print medium and/or produce a three-dimensional object. Examples of printing devices include ink/toner printers and/or three-dimensional printers, among other types of printing devices.

In some examples, the print particle refill bottle 200 may have a syringe like structure to transfer print particles into a reservoir. As used herein, "syringe" refers to a reciprocating pump including a plunger and a tube, where the plunger may be linearly moved to allow the syringe to take in and/or expel liquid, powder, or gas through an orifice at the end of the tube. As used herein, "plunger" refers to a piston to take in and/or expel liquid, powder, or gas through an orifice at the end of a syringe. In some examples, the print particle refill bottle 200 may include a supply valve 202. The supply valve 202 may enter a receptacle connected to a reservoir to transfer print particles into the reservoir. For instance, print particles may travel through the supply valve 202 and through a receptacle to replenish the amount of print particles in the reservoir. It should be understood that when an element is referred to as being "in contact," "connected to", or "coupled to" another element, it may be directly in contact, connected, or coupled with the other element or intervening elements may be present. In contrast, when an object is "directly in contact with" another element it is understood that are no intervening elements etc.

In some examples, the print particle refill bottle 200 may include a body 208 to store print particle. The body 208 may store print particles of varying types and forms. For example, the body 208 may store print particles made of a powdered semi-crystalline thermoplastic material, a powdered metal material, a powdered plastic material, a powdered composite material, a powdered ceramic material, a powdered glass material, a powdered resin material, and/or a powdered polymer material, among other types of powdered or particulate material. The print particles may be particles with an average diameter of less than one hundred microns. For example, the print material particles may be particles with an average diameter of between 0-100 microns. However, examples of the disclosure are not so limited. For example, print particles may be particles with an average diameter of between 20-50 microns, 5-10 microns, or any other range between 0-100 microns.

In some examples, print particles may travel from the body 208 and through a print particle entrance (e.g., print particle entrance 110 of FIG. 1) into the supply valve 202 to replenish a reservoir. That is, the body 208 may be a collapsible body that allows print particles to travel from the body 208 to the supply valve 202 by collapsing or squeezing the body 208. However, examples of the disclosure are not so limited. In some examples, the body 208 may include a plunger that causes the print particles stored in the body 208 to travel from the body 208 into the supply valve 202. That is, the plunger may be pushed to cause print particles to move towards a print particle exit 204 of the supply valve 202.

In some examples, the print particle refill bottle 200 may include a liner 206 connected to the print particle exit 204. The liner 206 may clean the surface of the supply valve 202 after a refill process. In some examples, the liner 206 may clean the surface of the supply valve 202 before the transition of print particles to the reservoir. That is, the liner 206 may wipe the surface of the supply valve 202 as the print particle refill bottle 200 transitions into an open position. Similarly, the liner 206 may wipe residual print particles from the surface of the supply valve 202 after a refill process is complete. For instance, after the refill process is completed the liner 206 may wipe the print particle exit 204 limiting the amount of residual print particles on the surface of the supply valve 202. As used herein, "open position" refers to a position of a supply valve, print particle refill bottle, or receptacle that allows the communication of print particles into a reservoir. As used herein, "closed position" refers to a position of a supply valve, print particle refill bottle, or receptacle that prevents the communication of print particles into a reservoir.

Figure 3:
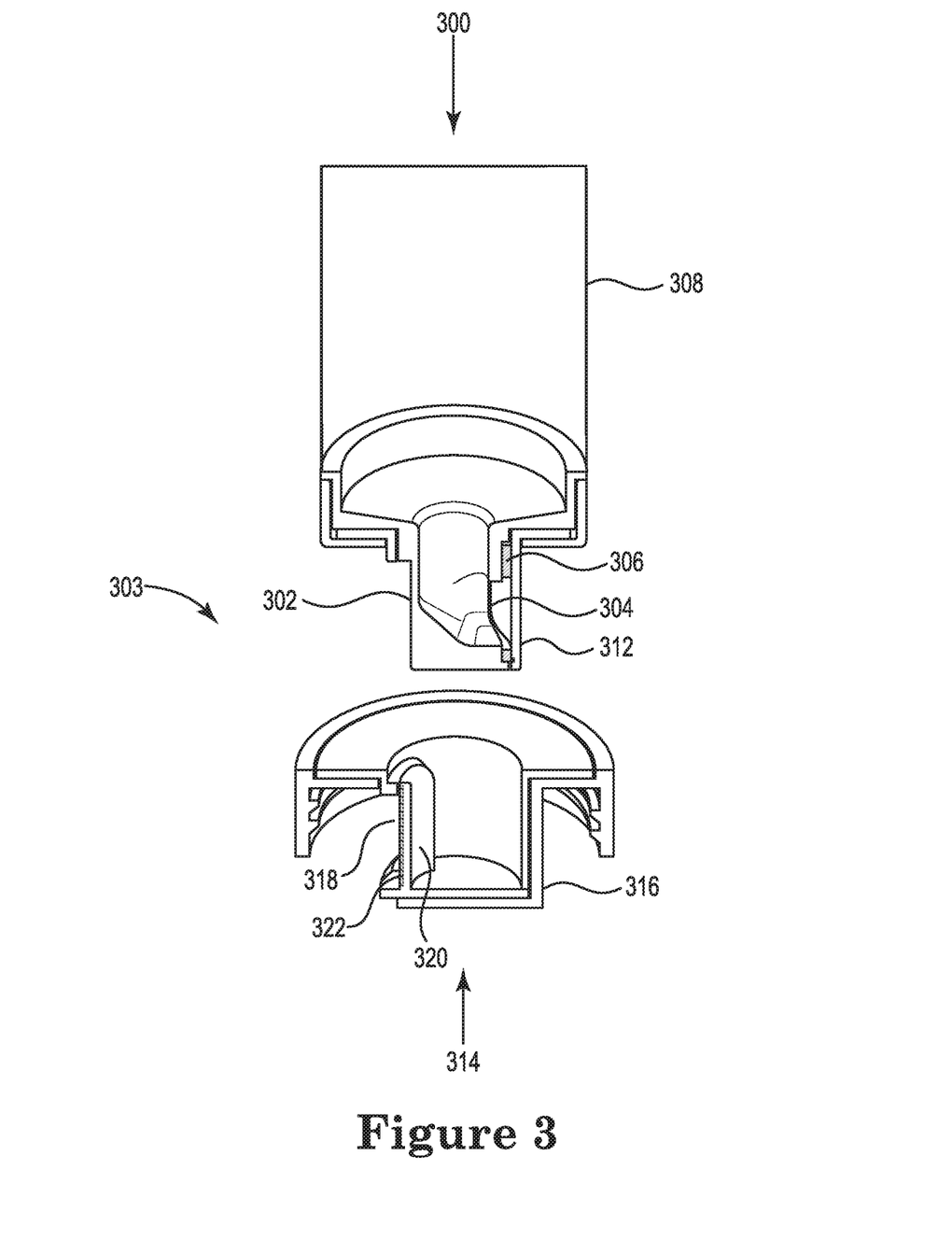
FIG. 3 illustrates an example of a system consistent with the disclosure.

FIG. 3 illustrates an example of a system 303 consistent with the disclosure. Supply valve 302 is analogous or similar to supply valve 102 and 202 of FIGS. 1 and 2, respectively. Print particle exit 304 is analogous or similar to print particle exit 104 and 204 of FIGS. 1 and 2, respectively. Liner 306 is analogous or similar to liner 106 and 206 of FIGS. 1 and 2, respectively. Body 308 is analogous or similar to body 208 of FIG. 2.

In some examples, the system 303 may include a print particle refill bottle 300. The print particle refill bottle may include a body 308. The body 308 may store print particles and supply print particles to the reservoir by transitioning the print particles through the supply valve 302. For instance, print particles may travel from the body 308 through a print particle entrance (e.g., print particle entrance 110 of FIG. 1) and through a print particle exit 304 perpendicular to the print particle entrance to replenish the reservoir.

In some examples, the supply valve 302 may include a cover 312 to prevent print particles from exiting the supply valve 302 when the supply valve 302 is in a closed position. That is, the cover 312 may be adjacent to the print particle exit 304 when the supply valve 302 is in a closed position. For instance, when the supply valve 302 is in a closed position the cover 312 may be substantially aligned with the print particle exit 304. In contrast, when the supply valve 302 is in an open position the cover 312 may be substantially offset with the print particle exit 304. In some examples, the cover 312 may ensure that the user does not come in contact with the print particle exit 304. That is, the cover 312 may block the print particle exit 304 until the supply valve 302 transition into an open position. However, the supply valve 302 may not transition into an open position until it is inserted into the receptacle 314 and rotated thereby limiting the amount of print particles that come in contact with the user and other surfaces.

As used herein, the term substantially intends that the characteristic does not have to be absolute but is close enough so as to achieve the characteristic. For example, "substantially aligned" is not limited to absolutely aligned. For example, "substantially offset" is not limited to absolutely offset.

In some examples, the supply valve 302 may enter a receptacle 314 to transfer print particles into a reservoir. In some examples, the supply valve 302 may enter the receptacle 314 if the supply valve 302 is in a closed position. That is, if the supply valve 302 is in an open position (e.g., the cover 312 is substantially offset with the print particle exit 304) the supply valve 302 cannot enter the receptacle 314.

In various examples, the supply valve 302 may not transition into an open position unless it has entered the receptacle 314 and has been authenticated.

In some examples, the receptacle 314 may include a receptacle body 314 having an opening 324 to receive a supply valve 302. In addition, the receptacle 314 may include a receptacle exit 318. The receptacle exit 318 may allow print particles to enter a reservoir. That is, after the supply valve 302 enters the receptacle 314 and transitions into an open position, print particles may travel from the body 308 through a print particle entrance into the supply valve 302. The print particles may then travel through a print particle exit 304 perpendicular to the print particle entrance. In some examples, when the system 303 is in an open position the print particle exit 304 may be substantially aligned with the receptacle exit 318 allowing the print particles to travel through the receptacle exit 318. As used herein, "receptacle exit" refers to an opening of the receptacle through which material (e.g., print particles) may be moved.

In some examples, the receptacle 314 may include a receptacle cover 320. The receptacle cover 320 may prevent print particles from exiting the supply valve 302 and/or the receptacle 314 when the system 303 is in a closed position. That is, the receptacle cover 320 may be adjacent to the receptacle exit 318 when the system 303 is in a closed position. For instance, when the system 303 is in a closed position the receptacle cover 320 may be substantially aligned with the receptacle exit 318. In contrast, when the system 303 is in an open position the receptacle cover 320 may be substantially offset with the receptacle exit 318.

In some examples, the receptacle 314 may include a receptacle liner 322 coupled to the receptacle cover 320. The receptacle liner 322 may clean print particles from the receptacle exit 318 when the system 303 transitions into a closed position. The receptacle liner 322 may also clean print particles from the receptacles exit 318 when the system 303 transitions into an open position. For instance, as the system transition between positions the receptacle liner 322 may wipe the surface of the receptacle 314 removing residual print particles from the receptacle exit 318 and/or the print particle exit 304. The receptacle liner 322 may limit the amount of print particles present in the system 303 after a refill process is complete. That is, the receptacle liner 322 may wipe excess print particles from the system 303 to reduce the amount of print particles on the surface of the receptacle 314 and the supply valve 302.

In some examples, the receptacle liner 322 may be comprised of a densely compacted fabric to wipe and clean the receptacle exit 318 and/or the print particle exit 304 as the system 303 transitions between an open position and a closed position. For instance, the receptacle liner 322 may be comprised of cloth, felt, a variety of different textiles, or a combination thereof. However, this disclosure is not so limited. In some examples, the receptacle liner 322 may be comprised of a foam material to wipe the receptacle exit 318 and/or the print particle exit 304 as the system 303 transitions between an open position and a closed position.

In some examples, the supply valve 302 may include a liner 306 to wipe and/or clean the print particle exit 304 and/or the receptacle exit 318 after a refill process is complete. For example, the print particle exit 304 may come in direct contact with the receptacle exit 318 when the system 303 is in an open position thereby allowing the liner 306 and the receptacle liner 322 to wipe the surfaces of the print particle exit 304 and the receptacle exit 318 when the system 303 transitions into a closed position. In some examples, the liner 306 wiping excess print particles from the surface of the supply valve 302 and/or the surface of the receptacle 314 may limit the amount of print particles remaining on the surface of the receptacle 314 and supply valve 302. Reducing the amount of residual print particles on the system 303 after a refill process may limit the amount of print particles that may transfer onto the user as well as other non-intended surfaces.

In some examples, the liner 306 may be comprised of a densely compacted fabric to wipe the print particle exit 304 and/or the receptacle exit 318 as the system 303 transitions between an open position and a closed position. For example, the liner 306 may be comprised of cloth, felt, a variety of different textiles, or a combination thereof. However, this disclosure is not so limited. In some examples, the liner 306 may be comprised of a foam material to wipe the print particle exit 304 and/or the receptacle exit 318 as the system 303 transitions between an open position and a closed position.

Figure 4:
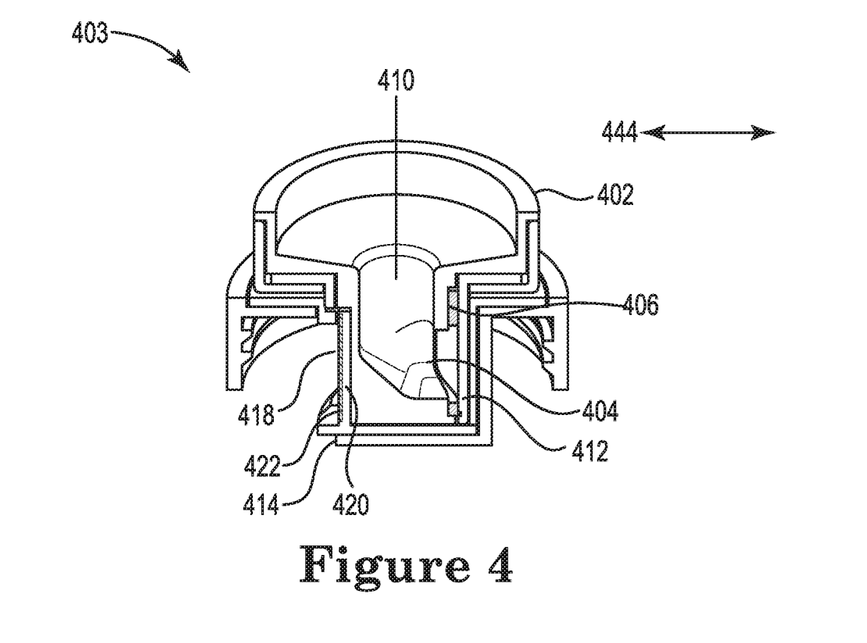
FIG. 4 illustrates an example of a system in a closed position consistent with the disclosure.

FIG. 4 illustrates an example of a system 403 in a closed position consistent with the disclosure. Supply valve 402 is analogous or similar to supply valve 102, 202, and 302 of FIGS. 1, 2, and 3, respectively. Print particle exit 404 is analogous or similar to print particle exit 104, 204, and 304 of FIGS. 1, 2, and 3, respectively. Liner 406 is analogous or similar to liner 106, 206, and 306 of FIGS. 1, 2, and 3, respectively. Print particle entrance 410 is analogous or similar to print particle entrance 110 of FIG. 1. Cover 412 is analogous or similar to cover 312 of FIG. 3. Receptacle cover 420 is analogous or similar to receptacle cover 320 of FIG. 3. Receptacle liner 422 is analogous or similar to receptacle liner 322 of FIG. 3. Receptacle exit 418 is analogous or similar to receptacle exit 318 of FIG. 3, Receptacle 414 is analogous or similar to receptacle 314 of FIG. 3. System 403 is analogous or similar to system 303 of FIG. 3.

In some examples, the system 403 may include a supply valve 402 and a receptacle 414. System 403 of FIG. 4 illustrates the system 403 in a closed position. The system 403 may be in a closed position when the print particle exit 404 and the receptacle exit 418 are substantially offset. Likewise, the system 403 may be in a closed position when the supply valve 402 and the receptacle 414 are in a closed position. The supply valve 402 may be in a closed position when the cover 412 is substantially aligned with the print particle exit 404. The receptacle 414 may be in a closed position when the receptacle cover 420 is substantially aligned with the receptacle exit 418.

In some examples, the supply valve 402 may enter the receptacle 414 in a closed position. That is, the supply valve 402 may be in a closed position when it enters the opening (e.g., opening 324 of FIG. 3) of the receptacle 414. In addition, the receptacle 414 may be in a closed position when the supply valve 402 enters the opening of the receptacle 414. In some examples, the system 403 may transition into a closed position by rotating the supply valve 402 in a direction as denoted by arrow 444. That is, after the transfer of print particles into the reservoir is complete the supply valve 402 may rotate to return the system 403 to a closed position. For instance, the system 403 may transition into a position where the cover 412 and the receptacle cover 420 are substantially offset. In addition, the system 403 may transition into a position where the print particle exit 404 and the receptacle exit 418 are substantially offset.

Figure 5:
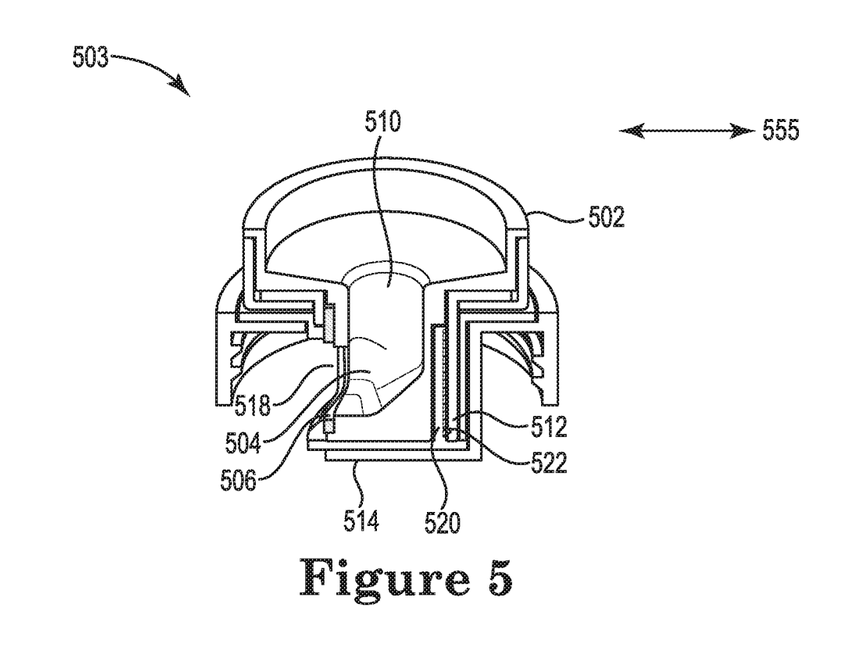
FIG. 5 illustrates an example of a system in an open position consistent with the disclosure.

FIG. 5 illustrates an example of a system 503 in an open position consistent with the disclosure. Supply valve 502 is analogous or similar to supply valve 102, 202, 302, and 402 of FIGS. 1, 2, 3, and 4, respectively. Print particle exit 504 is analogous or similar to print particle exit 104, 204, 304, and 404 of FIGS. 1, 2, 3, and 4, respectively. Liner 506 is analogous or similar to liner 106, 206, 306, and 406 of FIGS. 1, 2, 3, and 4, respectively. Print particle entrance 510 is analogous or similar to print particle entrance 110 and 410 of FIGS. 1 and 4, respectively. Cover 512 is analogous or similar to cover 312 and 412 of FIGS. 3 and 4, respectively. Receptacle cover 520 is analogous or similar to receptacle cover 320 and 420 of FIGS. 3 and 4, respectively. Receptacle liner 522 is analogous or similar to receptacle liner 322 and 422 of FIGS. 3 and 4, respectively. Receptacle exit 518 is analogous or similar to receptacle exit 318 and 418 of FIGS. 3 and 4, respectively. Receptacle 514 is analogous or similar to receptacle 314 and 414 of FIGS. 3 and 4, respectively. System 503 is analogous or similar to system 303 and 403 of FIGS. 3 and 4, respectively.

In some examples, the system 503 may include a supply valve 502 and a receptacle 514. System 503 of FIG. 5 illustrates the system 503 in an open position. The system 503 may be in an open position when the print particle exit 504 and the receptacle exit 518 are substantially aligned. Likewise, the system 503 may be in an open position when the supply valve 502 and the receptacle 514 are in an open position. The supply valve 502 is in an open position when the cover 512 is substantially offset with the print particle exit 504. The receptacle 514 may be in an open position when the receptacle cover 520 is substantially offset with the receptacle exit 518.

Figure 6:
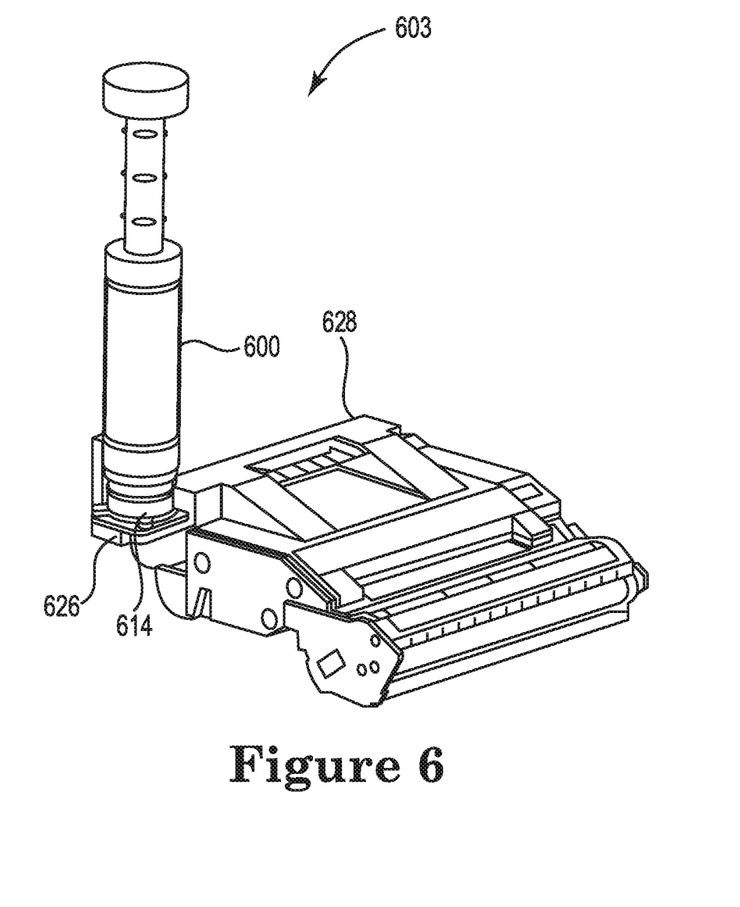
FIG. 6 illustrates an example of a system including a print particle refill bottle consistent with the disclosure.

In some examples, the system 503 may transition into an open position when the supply valve 502 may enters the receptacle 514 and rotates in a direction denoted by arrow 555. That is, before the print particles travel through the supply valve 502 and the receptacle 514 into the reservoir the supply valve 502 may rotate and cause the receptacle cover 520 to actuate and transition the receptacle 514 into an open position, thereby transitioning the system 503 into an open position. For instance, the system 503 may transition into a position where the print particle exit 504 and the receptacle exit 518 are substantially aligned. In addition, the system 403 may transition into a position where the cover 512 and the receptacle cover 520 are substantially aligned. In some examples, the cover 612 and the receptacle cover 520 may align when the receptacle cover 520 at as the supply valve 502 rotates. In addition, the cover 512 may remain in same position as the supply valve 502 rotates into an open position, FIG. 6 illustrates an example of a system 603 including a print particle refill bottle 600 consistent with the disclosure. Print particle refill bottle 600 is analogous or similar to print particle refill bottle 200 of FIG. 2. Receptacle 614 is analogous or similar to receptacle 314, 414, and 514 of FIGS. 3, 4, and 5, respectively. System 603 is analogous or similar to system 303, 403 and 503 of FIGS. 3, 4, and 5, respectively.

In some examples, the supply valve (e.g., supply valve 502 of FIG. 5) may be coupled to a print particle refill bottle 600. The print particle refill bottle 600 may house print particles to refill a reservoir 626. In some examples, the reservoir 626 may be removable inserted into a printing device 628. In some examples, the reservoir 626 may be coupled to a receptacle 614. The receptacle 614 may be accessible through the exterior of the printing device 628.

In the foregoing detailed description of the disclosure, reference is made to the accompanying drawings that form a part hereof, and in which is shown by way of illustration how examples of the disclosure may be practiced. These examples are described in sufficient detail to enable the disclosed examples, and it is to be understood that other examples may be utilized and that process, electrical, and/or structural changes may be made without departing from the scope of the disclosure. Further, as used herein, "a" may refer to one such thing or more than one such thing.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

It should be understood that the descriptions of various examples may not be drawn to scale and thus, the descriptions may have a different size and/or configuration other than as shown therein.

What is claimed:

1. A print particle refill bottle to supply print particles to a receptacle, the print particle refill bottle comprising:
    a body to store and supply print particles to a supply valve, the supply valve including a print particle exit;
    the supply valve to actuate when entering the receptacle; and
    the supply valve including a liner adjacent to the print particle exit, wherein the liner is to wipe print particles, when present, from the supply valve responsive to the transition of the supply valve between a closed position and an open position,
    wherein the print particle refill bottle is a syringe type structure and the body includes a plunger to move the print particles towards the supply valve.

2. The print particle refill bottle of claim 1, wherein the body is a collapsible body to store particles and move the particles towards the print particle exit.

3. The print particle refill bottle of claim 1, wherein the supply valve further comprising a print particle entrance perpendicular to the print particle exit.

4. A system comprising:
    a print particle refill bottle including:
        a body to store and supply print particles to a supply valve, the supply valve including a print particle exit, the supply valve to actuate when the supply valve rotates in the receptacle body;
        a cover coupled to the supply valve; and
        the supply valve including a liner adjacent to the print particle exit, wherein the liner is to wipe print particles, when present, from the supply valve responsive to the transition of the system between a closed position and an open position, wherein the print particle refill bottle is a syringe type structure and the body includes a plunger to move the print particles towards the supply valve; and
    the receptacle including:
        a receptacle body including an opening to receive the print particle refill bottle;
        a receptacle cover disposed inside of the opening, wherein the receptacle cover is to actuate when to the supply valve rotates in the receptacle body;
        a receptacle exit; and
        a receptacle liner coupled to the receptacle cover, wherein the receptacle liner is to wipe print particles, when present, from the receptacle responsive to the receptacle cover actuation.

5. The system of claim 4, wherein the receptacle is coupled to a reservoir and wherein the receptacle is accessible through the exterior of a printing device.

6. The system of claim 4, wherein the cover and the receptacle cover are substantially offset when the system is in a closed position.

7. The system of claim 6, wherein the receptacle exit and the print particle exit are substantially offset when the system is in the closed position.

8. The system of claim 4, wherein the cover and the receptacle cover are substantially aligned when the system is in an open position.

9. The system of claim 8, wherein the receptacle exit and the print particle exit are substantially aligned when the system is in the open position.

* * * * *